United States Patent [19]

Sakai

[11] Patent Number: 4,933,896
[45] Date of Patent: Jun. 12, 1990

[54] WORD PROCESSING APPARATUS FOR COMPARING ENTERED DATA WITH STORED DATA FROM A SELECTED ADDRESS AND IN A SELECTED ORDER

[76] Inventor: Toshiyuki Sakai, 1-23-2, Kamiyama-cho, Mizuhi-ku, Nagoya-shi, Aichi-ken, Japan

[21] Appl. No.: 152,293

[22] Filed: Feb. 4, 1988

[30] Foreign Application Priority Data

Feb. 4, 1987 [JP] Japan .................. 62-24229

[51] Int. Cl.⁵ .................. G06F 15/00; G06F 3/14
[52] U.S. Cl. .................. 364/900; 364/927.61; 364/948.1; 364/975; 364/943.41; 364/419; 364/521; 400/76
[58] Field of Search ... 364/200 MS File, 900 MS File, 364/518, 419, 521; 400/63, 76, 83

[56] References Cited

U.S. PATENT DOCUMENTS

| 4,136,395 | 1/1979 | Kolpek et al. ................ 364/518 |
| 4,481,607 | 11/1984 | Kobayashi et al. ............ 364/900 |
| 4,651,300 | 3/1987 | Suzuki et al. ................. 364/900 |
| 4,671,684 | 6/1987 | Kojima et al. ................. 400/63 |
| 4,751,674 | 6/1988 | Aoyogi et al. ................. 364/900 |
| 4,758,977 | 7/1988 | Morimoto et al. ............. 364/900 |
| 4,775,251 | 10/1988 | Suzuki et al. ................. 364/419 X |
| 4,787,059 | 11/1988 | Yochimura ..................... 364/900 |

OTHER PUBLICATIONS

Volkswriter Deluxe Plus Spelling Manual, pp. 1-8, 1-1-1-12, 6-2-6-9, 1986.
Word Writer ST User Manual, pp. 64-69, 1982.

Primary Examiner—Thomas C. Lee

[57] ABSTRACT

A word processing apparatus has the capability of comparing entered data stored in a text memory with stored data in a dictionary memory from a selected address in the text memory and in a selected order.

5 Claims, 5 Drawing Sheets

WORD PROCESSING APPARATUS FOR COMPARING ENTERED DATA WITH STORED DATA FROM A SELECTED ADDRESS AND IN A SELECTED ORDER

BACKGROUND OF THE INVENTION

The present invention relates to a word processing apparatus provided with information memories, and more specifically relates to a word processing apparatus capable of specifying the processing direction in processing of taking correspondence between entered data and information of the information memories. As disclosed in U.S. Pat. No.4,136,395, generally, word processing apparatuses provided with an information memory, for example, electronic typewriters have already been known which comprises a dictionary memory as an information memory storing a plurality of words in the controlling unit thereof and can check spelling of inputted words based on data of that dictionary memory. Furthermore, a search key is installed which is dedicated to searching for wrongly spelled words, and by depressing this search key in the typewriter mode, wrongly spelled words in the latest one print line where a print head is positioned can be searched for while the print head moves. Also, the one has already been known wherein by depressing this search key in the memory mode, first, each word from the word corresponding to the display position of a cursor to the head word of a text memory can be searched in sequence, and subsequently each word to the last word of the text memory can be searched.

In the typewriter or the like which searches for wrongly spelled words in sequence by the above-mentioned search key operation, in the typewriter mode, each word in the latest one print line is searched only in the printing direction or in the direction reverse thereto, and therefore the print head has to be moved to the print start position or print end position before depressing the search key due to the relation between the direction of search and the position of the print head. Thus, such a typewriter has a problem of poor operability.

Also, in the memory mode, for example, even when each word after the cursor is intended to be searched for wrong spelling, each word before the cursor is first searched, and therefore operation of moving the cursor is required. Thus, another problem of poor operability remains.

SUMMARY OF THE INVENTION

The principal object of the present invention is to provide a word processing apparatus wherein the direction or order of the processing of a search for an information in the information memory corresponding to data entered can be specified to improve the operability of the processing.

A word processing apparatus in accordance with the present invention comprises an entering means for entering data of characters and symbols and various command signals; a data memory for storing data entered from the entering means; an outputting means for outputting entered data to an outputting medium; an information memory storing information corresponding to data to be entered; searching means for processing a search for an information in the information memory corresponding to data read out from the data memory, according to a start address or a new address; start address specifying means for specifying the start address in the data memory, for starting the search to be processed by the searching means; order specifying means for specifying an order for specifying the new address; new address specifying means for specifying, after the searching means searched the information corresponding to the data specified by the start address, the new address according to the start address and the order; and result outputting means for outputting a result whether the information corresponding to the data is searched or not by the searching means.

For example, in case when the information memory is a dictionary memory, each word consisting of the entered data undergoes spelling check processing sequentially with words of the dictionary memory. The start position of that spelling check processing is specified by the cursor or the print head, and the direction or order of spelling check processing is specified by a forward search key or a reverse search key. Then, when a wrongly spelled word is detected, a buzzer sounds or candidate words for that wrongly spelled word are displayed.

In accordance with the word processing apparatus of the present invention, as described above, the start address in the data memory of the search processing is specified, and the direction or order of the search processing can be specified, and therefore the search processing can be performed in a desired direction or order, resulting in an improvement in the operability.

For example, in case when the information memory is a dictionary memory, in the typewriter mode, the printed words are spelling-checked sequentially from the word at the position of the print head in the printing direction or in the direction reverse thereto by searching the dictionary memory, and in the memory mode, word of the data memory are spelling-checked sequentially from the word at the position of the cursor toward the end address of the data memory or toward the head address thereof by searching the dictionary memory, and therefore spelling check can be made in a desired direction, resulting in an improvement in the operability.

DESCRIPTION OF THE PREFERRED EMBODIMENT

Hereinafter, description is made on an embodiment in accordance with the present invention with reference to drawings.

This embodiment is of the case where the present invention is applied to an electronic typewriter.

Figure 1:
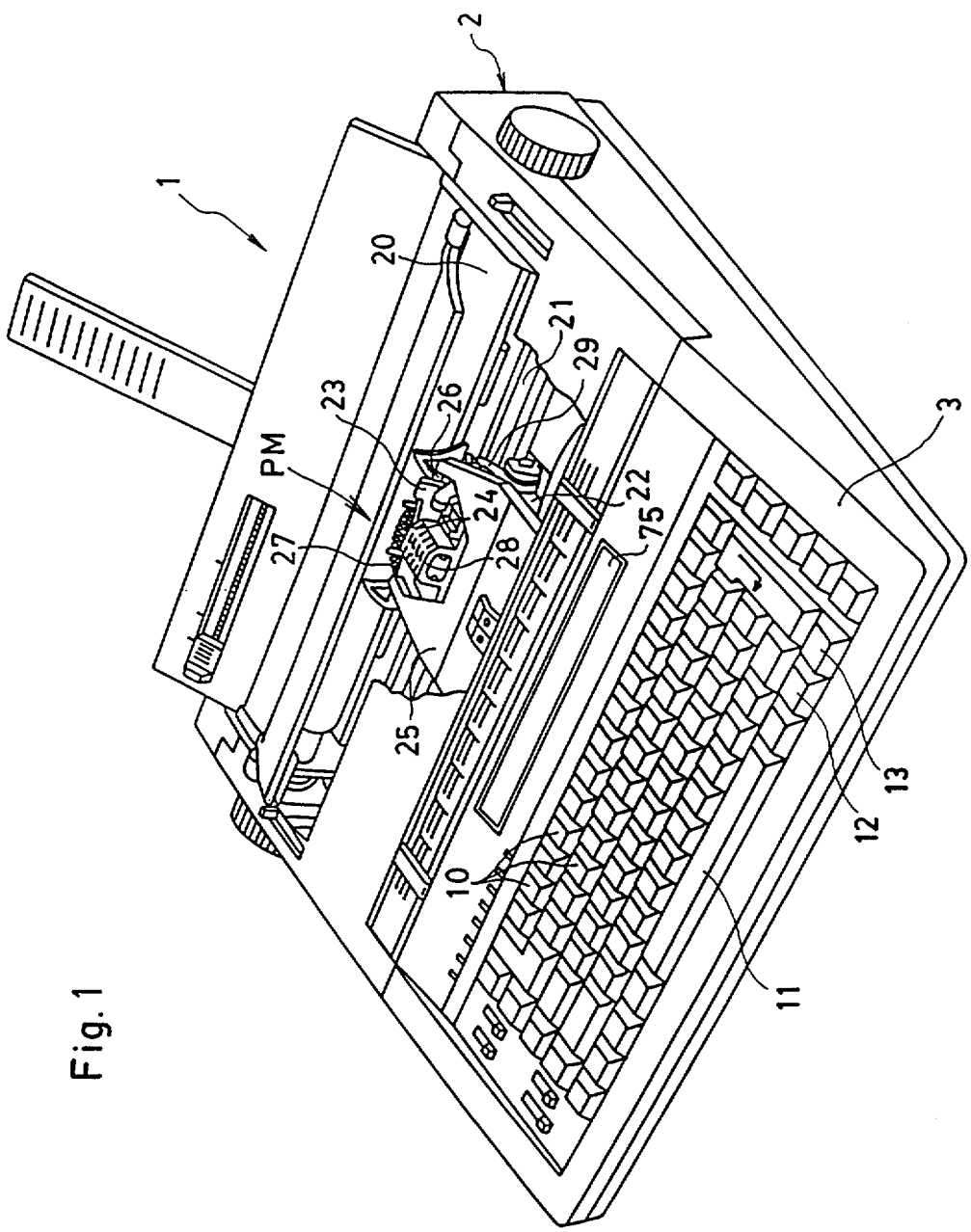
FIG. 1 is a perspective view of an electronic typewriter.
Figure 2:
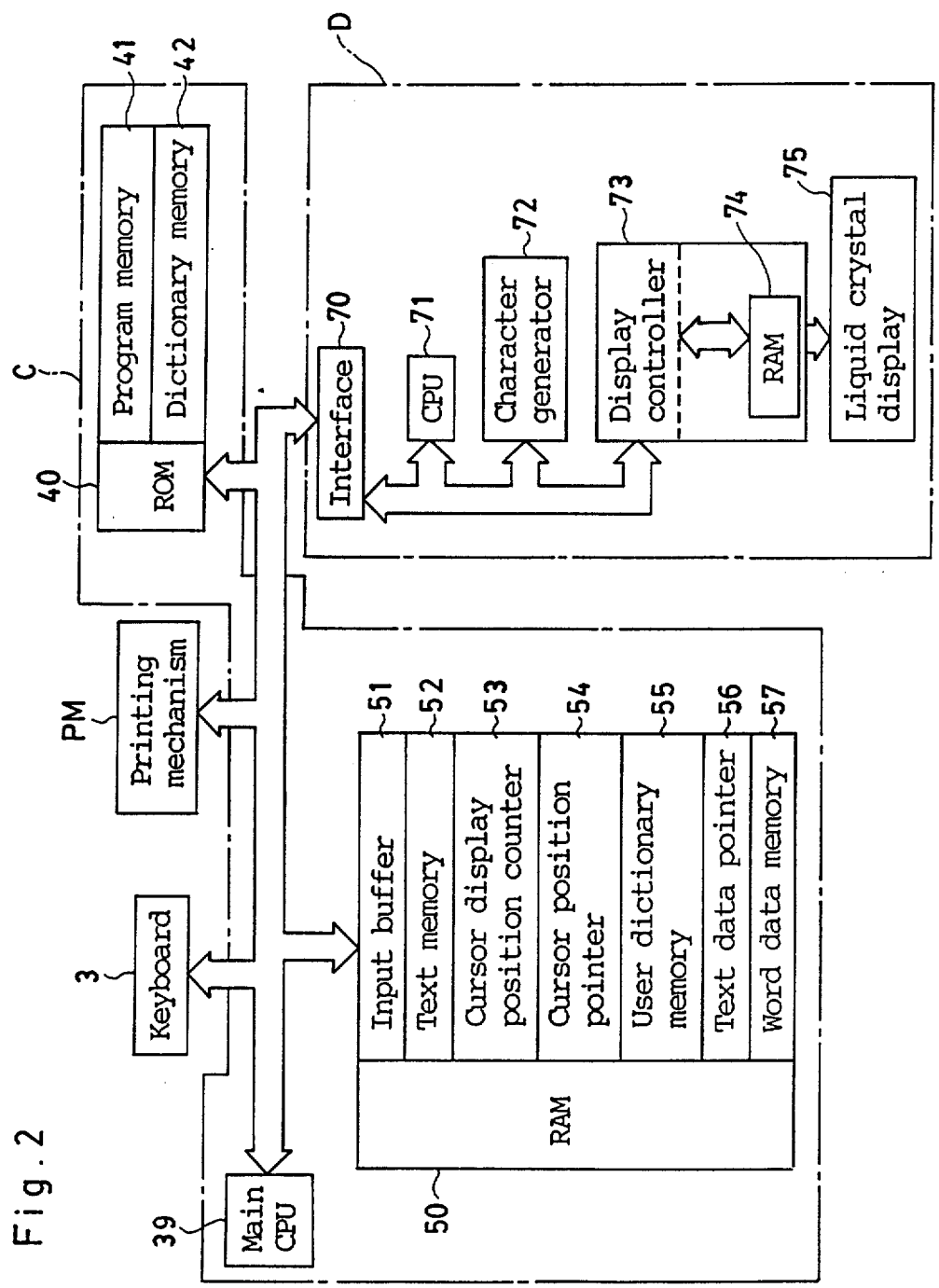
FIG. 2 is a block diagram of a control system of the typewriter as shown in FIG. 1, and FIGS. 3(a), 3(b), 3(c) represent a flow chart of a routine of searching control.

As shown in FIG. 2, a keyboard 3 is disposed in the front part of the main frame 2 of a typewriter 1, and in the main frame 2, a printing mechanism PM is disposed behind the keyboard 3, and a liquid crystal display 75 of one line of 40 digits for displaying the entered characters and symbols is installed in the rear part of the keyboard 3. On the keyboard 3, character keys 10 including alphabet keys, numeral keys and symbol keys and various function keys are installed likewise the ordinary typewriter, and further on the keyboard 3, a space key, a forward search key 12 for commanding spelling check of words in a text memory 52 sequentially from the cursor display position toward the end address of the text memory 52, a reverse search key 13 for commanding spelling check of words sequentially from the cursor display position toward the head address of the text memory 52, are installed.

The printing mechanism PM is provided with at least a platen 20 for feeding print paper and a motor driving it and a drive circuit thereof, a carriage 22 supported by a guide 21 parallel to the platen 20 and a motor driving it reciprocatively in the right-left direction and a drive circuit thereof, a type wheel 24 housed in a wheel cassette 23 and a motor driving it and a drive circuit thereof, a print ribbon 26 stored in a ribbon cassette 25 and a motor taking it up and a drive circuit thereof, a print hammer for hammering a type 27 of the type wheel 24 and a solenoid 28 for driving it and a drive circuit thereof, and a ribbon change-over mechanism selectively positioning the print ribbon 26 or a correction ribbon to the print position, and this printing mechanism is the same as the printing mechanism of the ordinary electronic typewriter.

Figure 3:
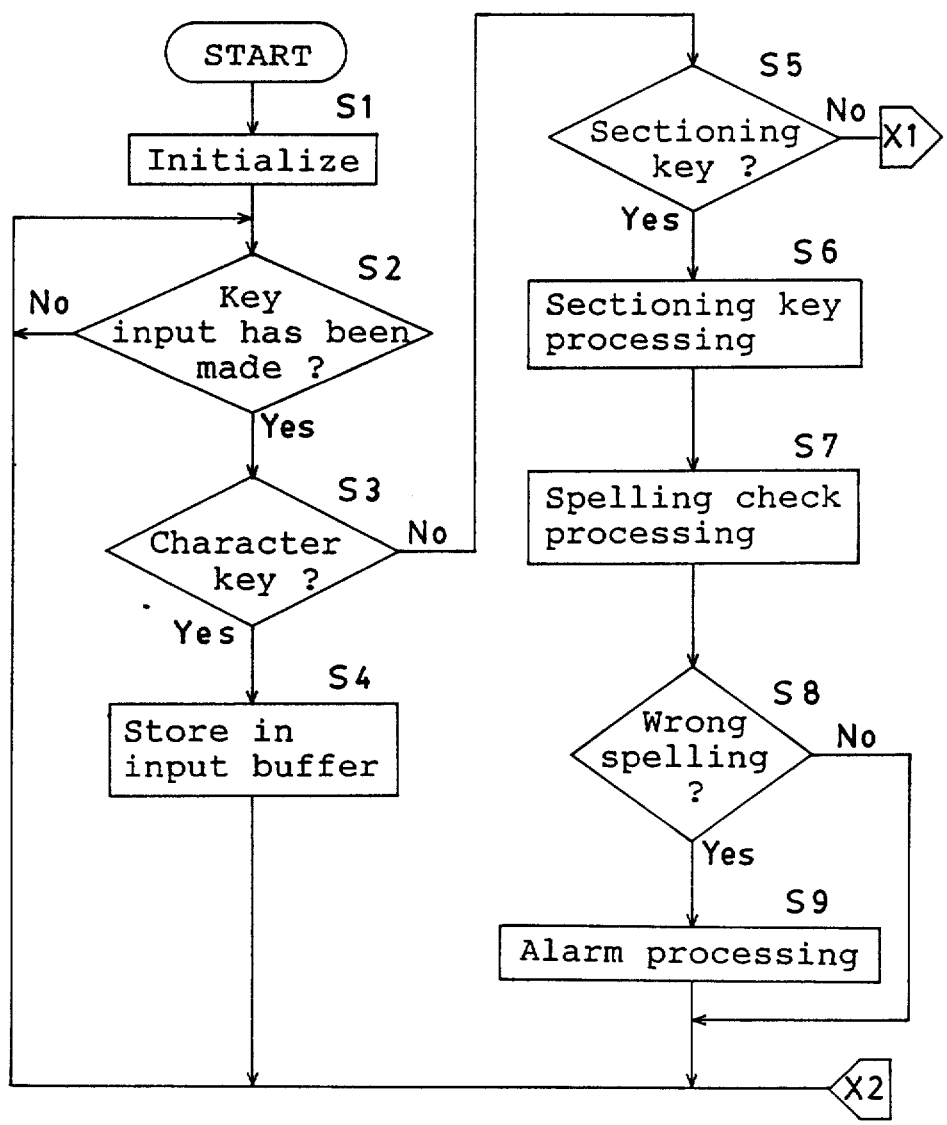
Figure 3B:
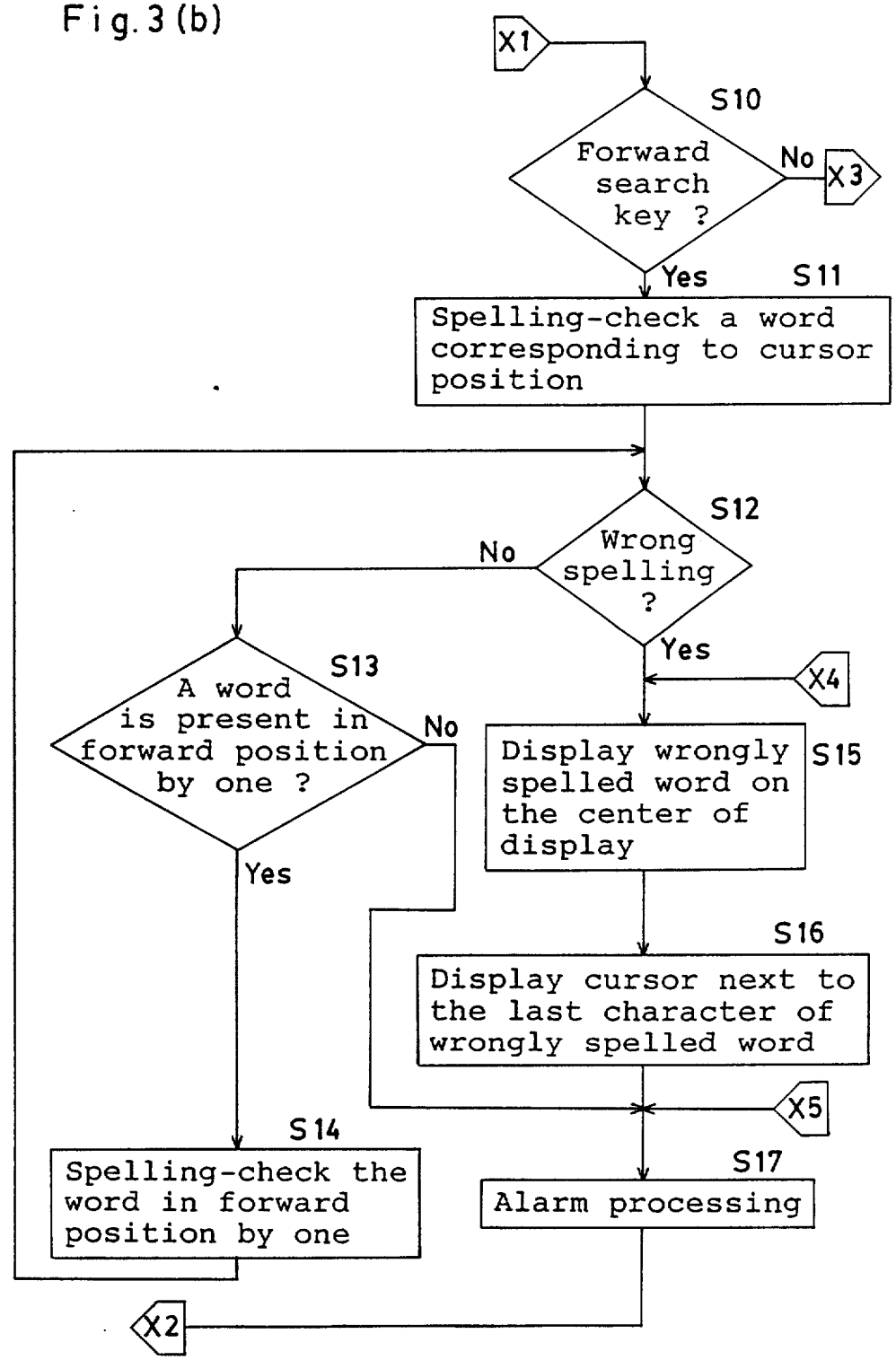
Figure 3C:
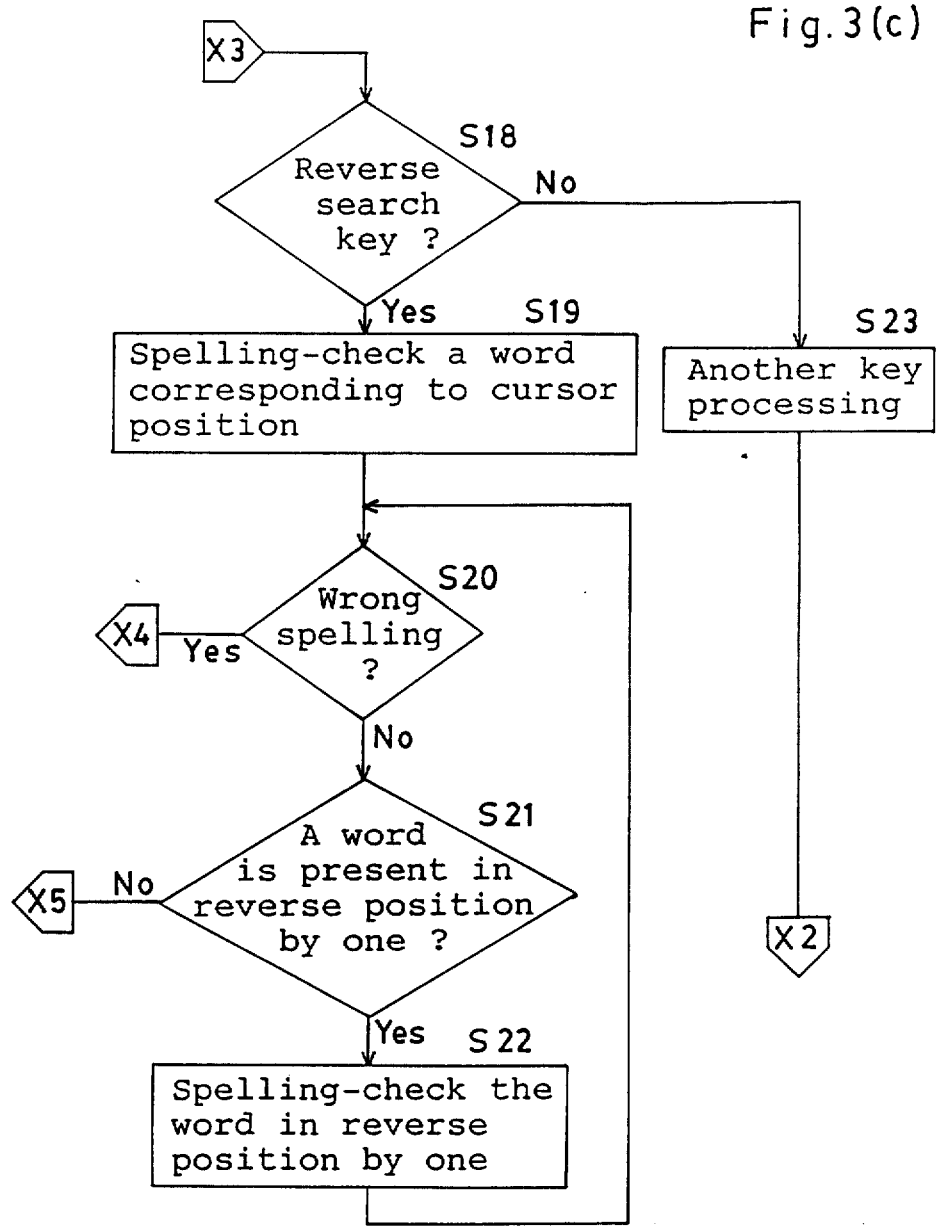

Next, description is made on the whole configuration of a control system of the electronic typewriter with reference to a block diagram in FIG. 3.

Basically, the typewriter 1 is constituted with the keyboard 3, the printing mechanism PM, a displaying mechanism D, a controlling unit C and the like, and the keyboard 3, the printing mechanism PM and the displaying mechanism D are connected to a main CPU (central processing unit) 39 of the controlling unit C through a data bus or the like.

The controlling unit C is constituted with the main CPU 39 and a ROM (read only memory) 40 and a RAM (random access memory) 50 which are connected to the main CPU 39 through the data bus or the like.

A program memory 41 of the ROM 40 stores a control program for controlling the printing mechanism PM and the displaying mechanism D so as to correspond to code data entered from the respective character keys and the various function keys on the key-board 3, a control program for spelling check processing, a control program for controlling erasure of characters, a control program for search control as described later and the like.

A dictionary memory 42 as an information memory stores data, for example, on about 70,000 words for spelling check of words in an alphabetical classification likewise the ordinary dictionary.

The RAM 50 is provided with a current position memory for storing the current position of the carriage 22 (print head) from the absolute origin so as to correspond to the print position in a manner of sequential renewal in the typewriter mode, a printed data memory for sequentially storing printed data of about 500 characters so as to correspond to the print position in the same mode, an input buffer 51 for storing data such as characters which are entered from the keyboard 3 or read from the text memory 52 and are displayed on the display 75 in the memory mode, a text memory 52 for storing entered data as file data in the same mode, a cursor display position counter 53 for counting the cursor display position in response to the movement of the cursor so as to correspond to each display position on the display 75, a cursor position pointer 54 for pointing out an address of the text memory 52 so as to correspond to data of the cursor display position counter 53, a user dictionary memory 55 as an information memory capable of freely registering and deleting words such as proper nouns not stored in the dictionary memory 42, a text data pointer 56 which sequentially detects the last position of a word and stores the address thereof in the text memory 52, various memories for temporarily storing the results of operational processing by the main CPU 39, and a word data memory 57 for storing words to be spelling-checked in a manner of sequential renewal.

In the typewriter mode, based on the control program, the main CPU 39 controls the printing mechanism PM to print characters and symbols corresponding to data entered from the respective character keys, and controls the printed data memory sequentially to store printed data so as to correspond to the print position.

Furthermore, in the memory mode, the main CPU 39 controls the input buffer 51 to store entered data of one print line, controls the display 75 to display it, and controls the text memory 52 to store that data of one line in response to an operation of a return key.

The displaying mechanism D is constituted with an interface 70, a CPU 71 for display, a character generator 72, a display controller 73 and a liquid crystal display 75, being connected as illustrated. The character generator 72 stores about 400 kinds of dot-matrix display data corresponding to code data to display characters and symbols on the display 75.

Based on command data and code data of characters and symbols outputted from the main CPU 39 through the interface 70, the CPU 71 for display reads out display data corresponding to these data from the character generator 72 and outputs the display data to the display controller 73. The display controller 73 writes above display data to a RAM 74 for display, and simultaneously outputs display signals corresponding to the display data to the display 75. Furthermore, the CPU 71 for display performs a cursor move control for pointing out the address of destination of the cursor for the display controller 73 through the interface 70 in response to cursor move data from the main CPU 39.

In the spelling check mode, by operating a word sectioning key such as the space key 11 or the return key (note that symbol keys such as period, comma, colon and semicolon keys are included) following entering of character data of a word, words having the same spelling as the entered word are searched by checking the entered word against each word in the dictionary memory 42 and the user dictionary memory 55. Then, when any word having the same spelling as the entered word is not present, the operator is alarmed of wrong spelling. Detailed description on this spelling check processing is omitted because it is the same as the existing one.

Next, description is made on search control performed by the controlling unit of the electronic typewriter with reference to a flow chart in FIG. 4.

By turning on the power switch of the typewriter, this control is started, and processing proceeds to step S1 (hereinafter, expressed simply as S1, and the same is true of the other steps), and initialization such as clearing of each memory is executed, and processing proceeds to S2 where waits for a key-input. When a key is depressed, processing proceeds to S3, and judgment is made on whether or not it is the character key 10, and if it is the character key 10, processing proceeds to S4, and the entered data corresponding to the operated character key 10 is stored in the input buffer 51 and the word data memory 57, and processing returns to S2. Then, S2-S4 are repeated and the data of a character string (word) is entered.

By depressing the word sectioning key such as the space key 11, processing proceeds to S5 via S2-S3. When judgment is made to be YES in S5, processing proceeds to S6, and the processing corresponding to the sectioning key is executed. In the next S7, based on data of the dictionary memory 42 and the user dictionary memory 55 and data of the word data memory 57, the inputted word undergoes spelling check processing, and judgment is made on whether or not it is of wrong spelling in S8, and if judgment is YES, processing proceeds to S9. In S9, alarm processing such as buzzer sounding or lamp lighting is performed, and processing returns to S2. In addition, if judgment is NO in S8, processing returns to S2.

When the forward search key 12 is operated, processing proceeds to S10 via S2, S3 and S5. If judgment is YES in S10, processing proceeds to S11. In S11, first data of the cursor position pointer 54 is written to the text data pointer 56, and subsequently the word data corresponding to the address pointed out by the text data pointer 56 is written to the word data memory 57, and data of the word data memory 57 is spelling-checked based on data of the dictionary memory 42 and the users' dictionary memory 55. At this time, the address in the text memory 52 of the last character of word data of the word data memory 57 has been written to the text data pointer 56.

In the following S12, judgment is made on whether or not the word is of wrong spelling, and if judgment is not wrong spelling, processing proceeds to S13. In S13, judgment is made on whether or not a word is present in forward position by one (toward end address of the text memory 52) from the word pointed by the text data pointer 56 based on data of the text memory 52 and data of the text data pointer 56, and if a word is present, processing proceeds to S14, and spelling check of the word is executed, and processing proceeds to S12. Then, S12-S14 are repeated, and the words on the forward side are spelling-checked in sequence, and if a wrong spelling is detected, processing proceeds to S15.

In S15, display data are scrolled so that a wrongly spelled word is displayed on the center of the display 75 based on the number of characters of the wrongly spelled word of the word data memory 57 and 40-digit data of the display 75. In the next S16, based on data of the text data pointer 56 and the text memory 52, sectioning data address next to (forward by one) the last character of the wrongly spelled word is written to the cursor display position counter 53, and the cursor is displayed next to the last character of the wrongly spelled word. In the next S17, since the wrongly spelled word has been detected, alarm processing such as buzzer sounding or lamp-lighting is performed, and processing returns to S2. In addition, when judgment is made to be NO in S13, that is, also when the spelling check has been completed to the last of the text memory 52, processing proceeds to S17, and the alarm processing is performed, and processing returns to S2. By operating the reverse search key 13, processing proceeds to S19 via S2, S3, S5 and S10. If judgment is YES in S18, processing proceeds to S19. In S19, first, data of the cursor position pointer 54 is written to the text data pointer 56, and subsequently the word data corresponding to the address pointed out by the text data pointer 56 is written to the word data memory 57, and data of the word data memory 57 is spelling-checked based on the data of the dictionary memory 42 and the user dictionary memory 55. At this time, the address in the text memory 52 of the last character of the word data of the word data memory 57 has been written to the text data pointer 56.

In the following S20, judgment is made on whether or not a wrong spelling is present, and if no wrong spelling is present, processing proceeds to S21. In S21, based on the data of the text memory 52 and the data of the text data pointer 56, judgment is made on whether or not a word is present in reverse position by one (toward head address of the text memory 52) from the word pointed out by the text data pointer 56, and if a word is present, processing proceeds to S22, and spelling check of the word is executed, and processing proceeds to S20. Then, S20-S22 are repeated and words on the reverse side are spelling-checked in sequence. If a wrong spelling is detected, processing goes through S15-S17, and display data are scrolled so that the wrongly spelled data is displayed on the center of the display 75, and alarm processing is performed, processing returning to S2. In addition, when judgment is NO in S21, that is, also when spelling check has been completed to the head of the text memory 52, processing proceeds to S17, and alarm processing is performed, processing returning to S2.

When judgment is NO in S18, that is, when the operated key is other than the character keys 10, the sectioning key, the forward search key 12 and the reverse search key 13, processing proceeds to S23, and the processing corresponding to the operated key is executed, processing returning to S2.

As described above, in addition to the search for wrongly spelled words from the current cursor display position to the forward side, the search for wrongly spelled words from the cursor display position toward the reverse direction can also be made, and therefore operation of moving the cursor to the head position of text data by the cursor move key is not required, and the spelling check can be made in a desired direction irrespective of the cursor display position, resulting in improvements in the operability and the working efficiency.

Here, it is possible to modify the word processing apparatus of the above embodiment as follows:

(1) The above search control is described on the case of the memory mode, but in the case of the typewriter mode or in the case of the one-by-one printing-type typewriter without display, it is also possible that by moving the carriage 22 carrying the print head in place of the cursor and rotating the platen 20, print paper is fed forward or backward and thereby spelling check is performed in the forward direction or in the reverse direction likewise.

(2) It is also possible that in addition to head words of a plurality of words for spelling check, the information memory stores synonyms, homonyms, inflective words, meanings and the like of each word, and candidate words for a wrongly spelled word are searched for and displayed besides spelling check, or synonyms, meanings or the like of entered words are searched for and displayed.

(3) In the above embodiment, description is made on the case where the dictionary memory 42 and the user dictionary memory 55 are installed as information memories, and the entered word is spelling-checked, but the present invention is also applicable likewise to information processing in word processing apparatuses such as word processors for Japanese language or European languages besides the spelling check processing in the electronic typewriter.

This means that it is also possible that the information memory stores head words of names of persons, names of companies or the like and information such as addresses, careers, names of goods dealt or the like corresponding to those head words, and the associated data corresponding to the entered data such as the name of person or the name of company are searched for and displayed.

What is claimed is:

1. A word processing apparatus for comparing entered data with stored data from a selected address and in a selected order comprising:

entering means for entering data representative of characters, words formed by characters, symbols and various command signals;

a text memory for storing data entered from said entering means;

display means for displaying at least a portion of said entered data at specified addresses, where said entered data are stored in said text memory, on a display, said display means comprising cursor control means for controlling movement of a cursor on said display;

a dictionary memory storing word data representative of a correct spelling of a plurality of words;

spelling check means for processing a search of said dictionary memory for word data having a spelling coincident with a spelling of word data read out from said text memory;

start address specifying means for selectively specifying a start address in said text memory for starting said read out of data stored in said text memory to be searched by said spelling check means, said start address specifying means comprising a cursor display position counter for storing data indicating a cursor position on said display in response to movement of the cursor and a cursor position pointer for specifying an address of data stored in said text memory corresponding to the position of the cursor as indicated by the data of said cursor display position counter, and said start address specifying means specifying the address indicated by said cursor position pointer as said start address;

order specifying means for selectively specifying an order of reading out data stored in said text memory from said specified start address, said order specifying means comprising a forward spell check key installed on said entering means for commanding said search by said spelling check means sequentially from said start address toward an end address in said text memory and a reverse spell check key installed on said entering means for commanding said search by said spelling check means from said start address toward a head address in said text memory; and result output control means for controlling said display means to display a word on a center of said display corresponding to word data read out from said text memory having a spelling which is not coincident with the spelling of word data contained in said dictionary memory.

2. A word processing apparatus according to claim 1, further comprising a word data memory for storing word data from said text memory to be processed by said spelling check means.

3. A word processing apparatus according to claim 2, further comprising a text data pointer for sequentially detecting a last position of character data in said text memory forming a word and for storing an address of said last position in said text memory.

4. A word processing apparatus according to claim 3, wherein data of said cursor position pointer is written to said text data pointer and subsequently word data corresponding to the address specified by said text data pointer is written to said word data memory and compared with word data of said dictionary memory.

5. A word processing apparatus according to claim 1, further comprising a new address specifying means for specifying a start address for starting said readout of data from said text memory after completion of said search by said spelling check means from said start address and a new order specifying means for specifying an order of reading out data in said text memory.

* * * * *

UNITED STATES PATENT AND TRADEMARK OFFICE
CERTIFICATE OF CORRECTION

PATENT NO. : 4,933,896
DATED : June 12, 1990
INVENTOR(S) : Toshiyuki Sakai

It is certified that error appears in the above-identified patent and that said Letters Patent is hereby corrected as shown below:

On the title page, insert the following:

[73] Assignee: Brother Kogyo Kabushiki Kaisha

Signed and Sealed this

Seventh Day of April, 1992

Attest:

HARRY F. MANBECK, JR.

*Attesting Officer*　　*Commissioner of Patents and Trademarks*